United States Patent [19]

Kawashima et al.

[11] Patent Number: 5,238,574
[45] Date of Patent: Aug. 24, 1993

[54] METHOD AND APPARATUS HAVING REVERSE OSMOSIS MEMBRANE FOR CONCENTRATING SOLUTION

[75] Inventors: Norihiro Kawashima, Akashi; Ken Yasukuni, Kobe; Koichi Tada, Miki; Naoki Masa, Kobe, all of Japan

[73] Assignee: Kawasaki Jukogyo Kabushiki Kaisha, Kobe, Japan

[21] Appl. No.: 719,507

[22] Filed: Jun. 24, 1991

[30] Foreign Application Priority Data

Jun. 25, 1990 [JP] Japan .................. 2-168097
Oct. 12, 1990 [JP] Japan .................. 2-275009

[51] Int. Cl.$^5$ .................. B01D 61/02; B01D 61/08
[52] U.S. Cl. .................. 210/652; 210/195.2; 210/257.2; 210/321.65
[58] Field of Search .................. 210/652, 641, 259, 634, 210/642, 644, 649–652, 195.2, 257.2, 258, 321.64, 321.65, 321.72

[56] References Cited

U.S. PATENT DOCUMENTS

| | | | |
|---|---|---|---|
| 3,906,250 | 9/1975 | Loeb | 210/652 |
| 4,141,825 | 2/1979 | Conger | 210/259 |
| 4,944,882 | 6/1990 | Ray et al. | 210/641 |

Primary Examiner—Frank Sever
Attorney, Agent, or Firm—Leydig, Voit & Mayer

[57] ABSTRACT

A method and an apparatus for treating salt water by a multiplicity of reverse osmosis membrane modules or a structure constituted by combining a multiplicity of reverse osmosis membrane modules and an evaporating device and thereby capable of efficiently treating it while preventing excessively large energy consumption. Salt water is passed through a plurality of reverse osmosis membrane modules so as to be separated into desalted water of a potable water level and high density concentrated water the salinity quality of which is 80,000 to 120,000 ppm.

19 Claims, 8 Drawing Sheets

METHOD AND APPARATUS HAVING REVERSE OSMOSIS MEMBRANE FOR CONCENTRATING SOLUTION

BACKGROUND OF THE INVENTION

The present invention relates to a method and an apparatus for treating salt water of a high salinity by passing it through a plurality of high and low pressure reverse osmosis membrane modules.

Since coal mines and water veins coexist with one another and the water vein is thereby able to pass through a rock salt layer, in, for example, eastern Europe, water discharged from the coal mine shows excessively high levels of salinity of 30,000 to 80,000 ppm. Therefore, the flow of this salt water into rivers, lakes and marshes causes serious environmental contamination in certain regions.

In order to overcome the above-described problem while preventing a secondary contamination, it is necessary to completely treat salt water in such a manner that it is separated into potable water or industrial water and concentrated water containing salt at high density or solid salt while preventing the discharge of salt water into rivers, lakes and marshes.

In order to achieve the above-described object, it might be considered feasible to employ a sole evaporation method, a method resulting from the combination of a single-stage reverse osmosis membrane method and the evaporation method and a method resulting from the combination of an electro-dialysis method and the evaporation method.

On the other hand, an apparatus capable of obtaining fresh water from sea water has been disclosed in Japanese Patent Laid-Open No. 55-31459. According to this disclosure, sea water, the salinity level of which is about 35,000 ppm, is passed through a high pressure reverse osmosis membrane module so as to supply desalted water to a low pressure reverse osmosis membrane module.

Another apparatus has been disclosed in Japanese Patent Utility Model Laid-Open No. 58-108195 in which a reverse osmosis membrane module displaying a low salt rejection and a reverse osmosis membrane module exhibiting a high salt rejection ratio are connected in series to each other in one vessel in such a manner that the reverse osmosis membrane module exhibiting a high salt rejection ratio is disposed in the lower stream in the apparatus.

In the case where the sole evaporation method is employed, the overall portion of potable water is obtained from evaporation and condensation, causing an excessively large energy loss to take place (since the phase change is involved according to the evaporation method, energy costs cannot be reduced in comparison to the fresh water generating method by means of the reverse osmosis membrane method or the like).

In the case where the single-stage reverse osmosis membrane method and the evaporation method are combined, the energy reduction can be achieved relatively satisfactorily with respect to the above-described sole evaporation method. However, the degree of concentration which can be realized by the single-stage reverse osmosis membrane is unsatisfactory, causing the necessity of evaporating a large quantity of water. Therefore, the energy consumption cannot be reduced satisfactorily.

Furthermore, if the salinity level of salt water supplied to the reverse osmosis membrane exceeds 60,000 ppm, ordinary reverse osmosis membranes for generating fresh water from sea water cannot be employed because of the restriction caused from the osmotic pressure (because the pressure is raised excessively). On the other hand, the low pressure reverse osmosis membrane cannot generate desalted water of a potable water quality.

In the case where the electrodialysis method and the evaporation method are combined, an excessive amount of energy is consumed in the electrodialysis step in a quantity in proportion to the salinity. Although the electrodialysis can be employed for the concentration step, it is not preferable because a large quantity of medium salinity water is undesirably discharged from the desalting side of the electrodialysis apparatus.

The system disclosed in Japanese Patent Laid-Open No. 55-31459 is a system for obtaining fresh water from sea water. Therefore, the degree of concentration which can be achieved at the time of concentrating water is relatively low compared to that which may be obtained by the present invention. What is even worse, concentrated water is abandoned.

The system disclosed in Japanese Utility Model Laid-Open No. 58-108195 is arranged in such a manner that salt water, the pressure of which has been raised to a predetermined level, is sequentially passed through a plurality of membrane modules. However, the above-made disclosure does not contain a technological concept of reducing the pressure of the medium density concentrated water to be supplied to the low pressure membrane module disposed at the second stage and a concept of raising the pressure of coarsely desalted water to be supplied to the high pressure membrane module disposed at the second stage.

SUMMARY OF THE INVENTION

Accordingly, an object of the present invention is to provide a method and an apparatus for treating salt water arranged in such a manner that salt water is treated by a structure constituted by combining a multiplicity of reverse osmosis membrane modules and by an evaporation device and is capable of reducing the energy consumption and exhibiting effective treating performance.

In order to achieve the above-described object, the method of treating salt water according to the present invention is characterized in that salt water is passed through a multiplicity of reverse osmosis membrane modules to separate it into desalted water of a potable water quality and high density concentrated water the salinity level of which is 80,000 to 120,000 ppm. Furthermore, by adding one or more low pressure reverse osmosis membrane modules after the reverse osmosis membranes described above, it is possible to obtain concentrated water, the salinity level of which is about 150,000 to about 155,000 ppm.

DESCRIPTION OF THE PREFERRED EMBODIMENT

Figure 1:
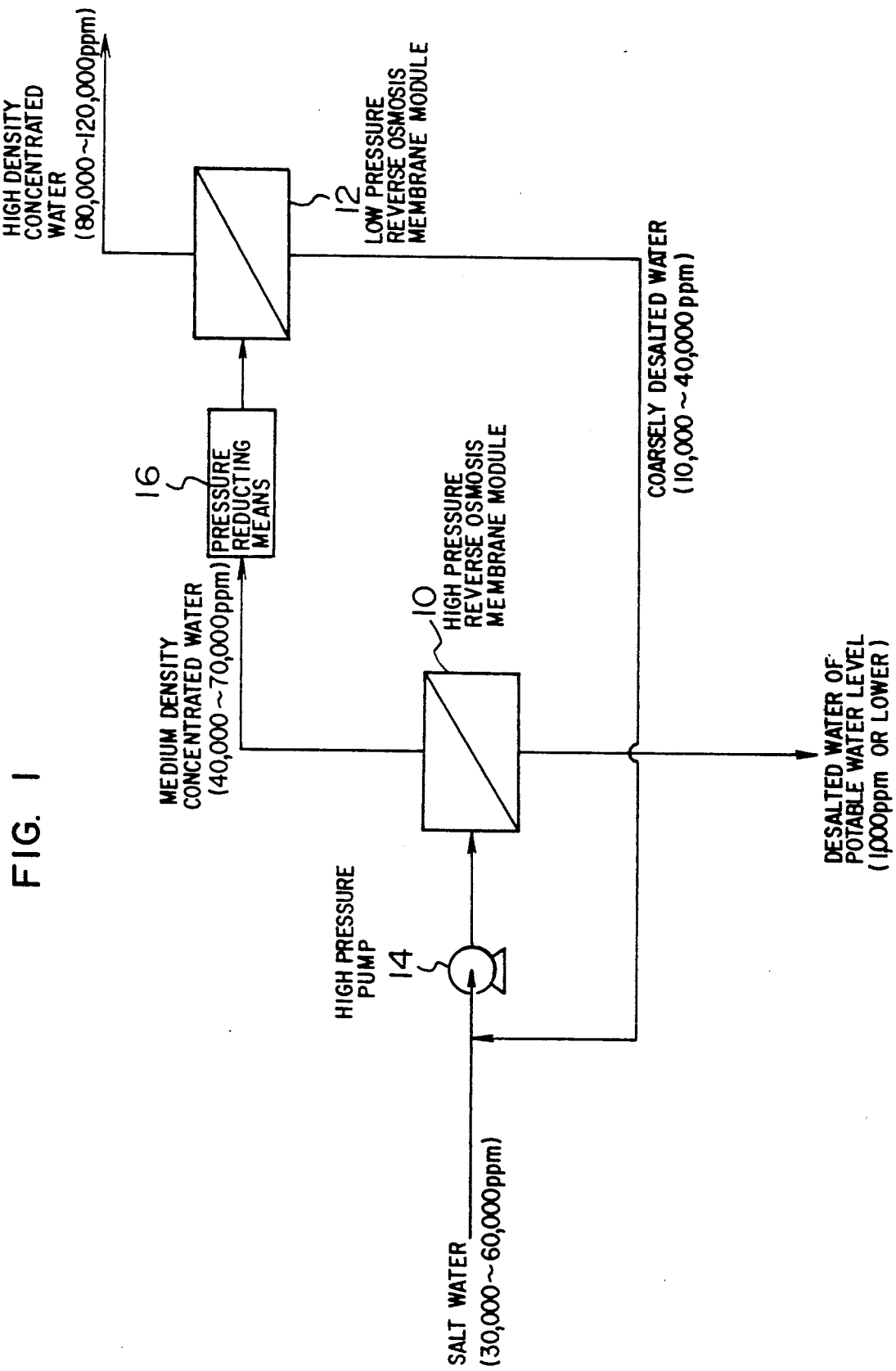
FIG. 1 schematically illustrates an embodiment of an apparatus for performing a method of treating salt water according to the present invention.

As shown in FIG. 1, a treatment of salt water according to the present invention is conducted in such a manner that the pressure of salt water, the salinity level of which is a relatively low value of 30,000 to 60,000 ppm, is raised to 40 to 70 kg/cm$^2$G by a pressure pump 14. Then, it is passed through a high pressure reverse osmosis membrane module 10 so that it is separated into desalted water of a potable water quality and medium density concentrated water. Then the medium density concentrated water is passed through pressure reducing means 16 and a low pressure reverse osmosis membrane module 12 so that it is separated into coarsely desalted water and high density concentrated water the salinity level of which is 80,000 to 120,000 ppm. Furthermore, by adding one or more low pressure reverse osmosis membrane modules after the reverse osmosis membrane module 12, it is possible to obtain concentrated water, the salinity level of which is about 150,000 to about 155,000 ppm.

The coarsely desalted water supplied from the low pressure reverse osmosis membrane module 12 is then supplied to a high pressure reverse osmosis membrane module 10.

According to this embodiment which is shown in FIG. 1, the salinity level of medium density concentrated water supplied from the high pressure reverse osmosis membrane module 10 is 40,000 to 70,000 ppm. The high pressure reverse osmosis membrane module 10 is able to generate desalted water of the potable water level, the salinity level of which is 1,000 ppm or lower, preferably, 500 ppm or lower.

Figure 2:
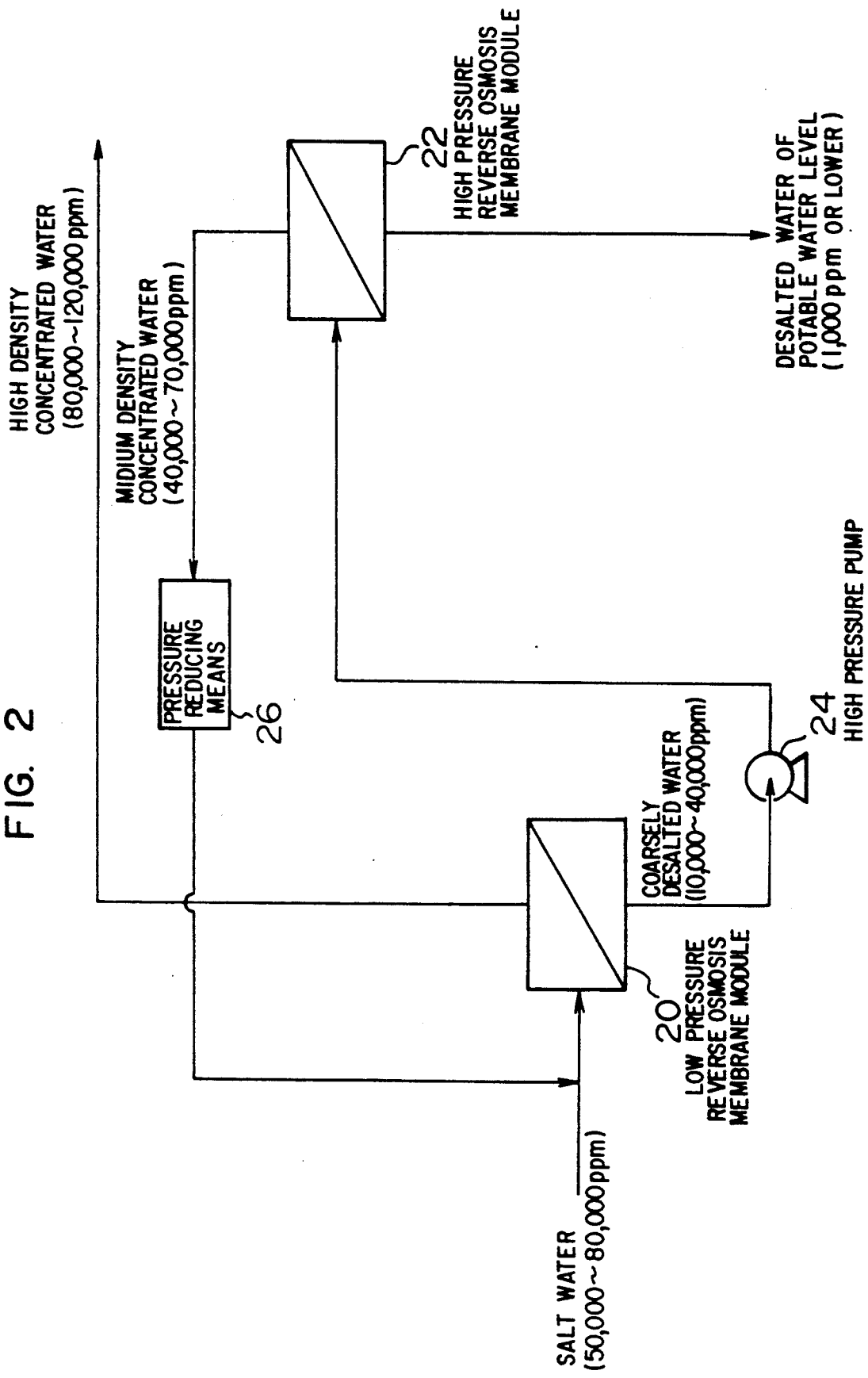
FIG. 2 schematically illustrates another embodiment of the apparatus according to the present invention.

According to another embodiment which is shown in FIG. 2, salt water of a relatively high density of 50,000 to 80,000 ppm is, under pressure the level of which is 30 to 70 kg/cm$^2$G, passed through a low pressure reverse osmosis membrane module 20 so that it is separated into coarsely desalted water and high density concentrated water the salinity level of which is 80,000 to 120,000 ppm. Then, the pressure of coarsely desalted water thus-obtained is, by a high pressure pump 24, raised to 40 to 70 kg/cm$^2$G before it is passed through a high pressure reverse osmosis membrane module 22. As a result, it is separated into desalted water of the potable water level and medium density concentrated water.

Medium density concentrated water supplied from the high pressure reverse osmosis membrane module 22 is, via a pressure reducing means 26, supplied to the low pressure reverse osmosis membrane module 20.

It is preferable that the structure be constituted in such a manner that high density concentrated water supplied from the low pressure reverse osmosis membrane modules 12 and 20 and the salinity level of which is 80,000 to 120,000 ppm is supplied to an evaporation process so as to obtain salt in the form of crystals. In this case, it is possible to obtain concentrated water, the salinity level of which is about 150,000 to about 155,000 ppm, by adding one or more low pressure reverse osmosis membrane modules after the reverse osmosis membrane modules 12 and 20.

According to the embodiment shown in FIG. 2, the salinity level of medium density concentrated water supplied from the high pressure reverse osmosis membrane module 22 is 40,000 to 70,000 ppm. The high pressure reverse osmosis membrane module 22 is able to generate desalted water of the potable water level, the salinity level of which is 1,000 ppm or lower, preferably, 500 ppm or lower.

According to the present invention, the term "high pressure membrane" means a membrane exhibiting a salt rejection ratio of about 98% or higher in a case where salt water, the density of which is 1 to 5 wt%, is treated, the membrane being usually used under high pressure, the level of which is 50 kg/cm$^2$G or higher. On the other hand, the term "low pressure membrane" means a membrane displaying a salt rejection ratio of about 98% or lower in a case where salt water, the density of which is about 0.1 to 1 wt %, is treated, the membrane being usually used under low pressure, the level of which is 30 kg/cm$^2$G or lower.

Each of the above-described two types of reverse osmosis membrane modules is in the form of a hollow fiber type, a spiral type, a tubular type, a pleated type, a flat plate type or the like made of a polymer material such as cellulose acetate. In particular, the low pressure membrane module is usually made of a polymer composite membrane.

The low pressure membrane is usually used to desalt low-density salt water (the salinity level of which is about 5,000 ppm). According to this embodiment, relatively high density salt water, the salinity level of which is about 50,000 to 80,000 ppm, is treated under pressure, the level of which is about 30 to 70 kg/cm$^2$G, by utilizing the characteristic that the low pressure membrane displays the low salt rejection ratio.

As the pressure reducing means 16 and 26, a pressure reducing valve or a restriction orifice or the like is employed.

Further embodiments according to the present invention are described below.

Figure 3:
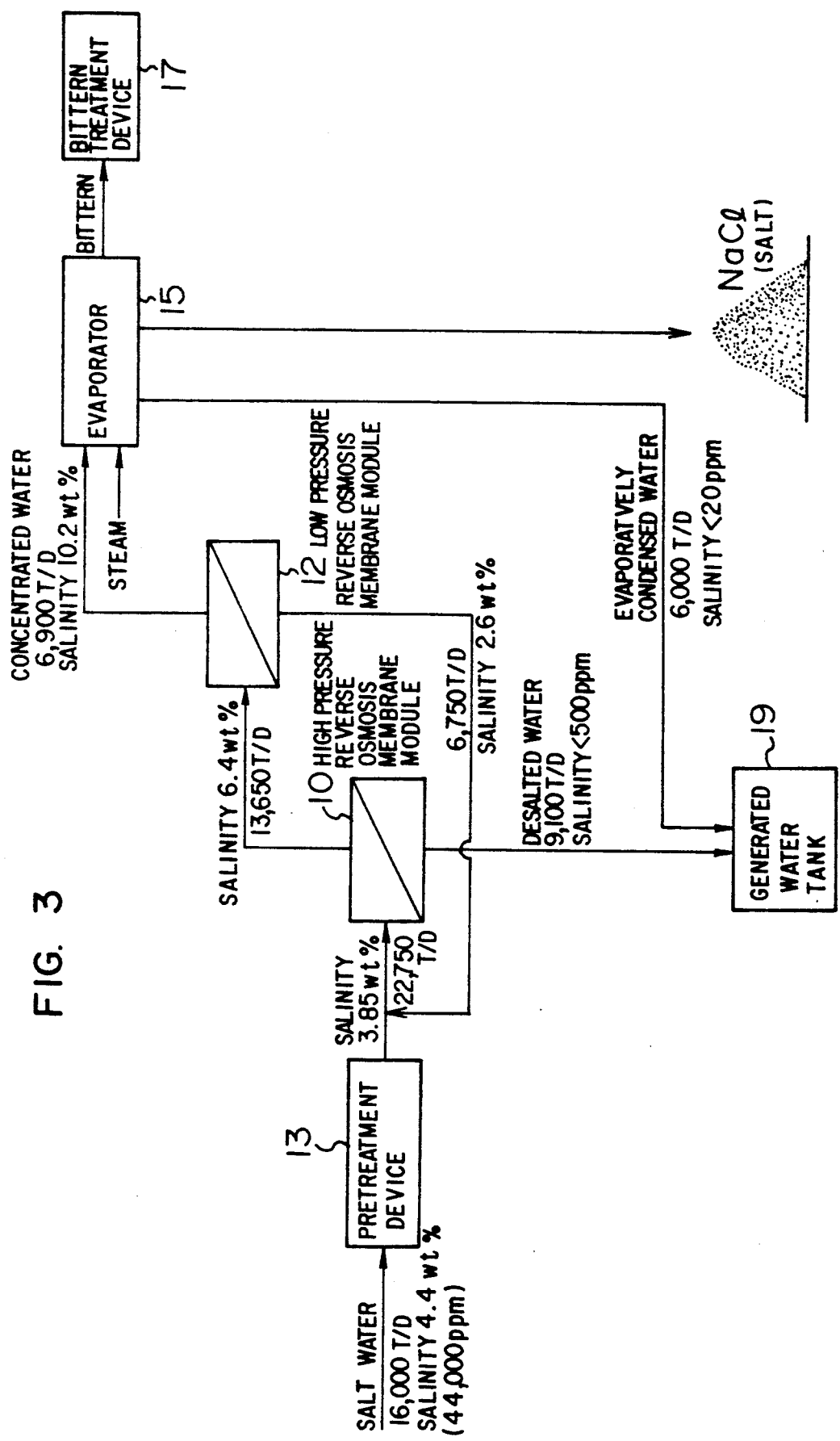
FIG. 3 schematically illustrates a further embodiment for treating salt water of a relatively low density (44,000 ppm)

FIG. 3 illustrates a case where salt water, the flow rate of which is 16,000 T/D and salinity of which is 44,000 ppm, is treated by a system constituted by combining a two-stage reverse osmosis membrane method and the evaporation method.

Salt water is first introduced into a pretreatment device 13 in which solid materials and iron and manganese contents, which are contained in a trace quantity in salt water, are removed before Ca is removed and pH is adjusted to about 6.5 (pH before the treatment is about 7.5). Then, the pressure of salt water is raised to about 65 kg/cm²G before it is supplied to the first high-pressure reverse osmosis membrane module 10. At this time, the flow rate is 22,750 TD and the salinity is 38,500 ppm.

The salinity of salt water to be supplied to the high pressure reverse osmosis membrane module 10 is lowered to 38,500 ppm because desalted water (the flow rate is 6,750 T/D and the salinity is 26,000 ppm) supplied from the second low-pressure reverse osmosis membrane module 12 is joined with the stream from the pretreatment device 13. A portion equivalent to about 40% of supplied salt water passes through the high pressure membrane so that desalted water of 9,100 T/D of the potable water level the salinty of which is 500 ppm or lower is obtained, desalted water thus-obtained being then supplied to a product water tank 19. The residual portion equilvalent to that is, a portion about 60% of supplied salt water is concentrated to about 1.7 times so that concentrated water the flow rate of which is 13,650 T/D and salinity of which is 64,000 ppm is obtained.

The concentrated water thus-generated from the above-described high pressure reverse osmosis membrane 10 is, under pressure, the level of which is about 60 kg/cm²G, then supplied to the low pressure reverse osmosis membrane module 12, which employs a synthetic composite membrane having a characteristic of low operational pressure and a low salt rejection ratio. At this time, a portion of about 49% of the supplied quantity passe through the low pressure membrane so that 6,750 T/D desalted water, the salinity level of which is about 26,000 ppm, is obtained. The residual portion, that is, a portion of about 51% of the supplied quantity is concentrated to a salinity of 102,000 ppm, concentrated water thus-obtained being then supplied to the ensuing evaporating device 15 (for example, a multi-effect evaporating device).

Desalted water obtained by the low pressure reverse osmosis membrane module 12 is returned to the supply side of the high pressure reverse osmosis membrane module 10 so that it joins the salt water supply, which has been subjected to a pretreatment before being treated by the high pressure reverse osmosis membrane module 10. Reference numeral 17 represents a bittern treatment device and 19 represents a product water tank.

Figure 4:
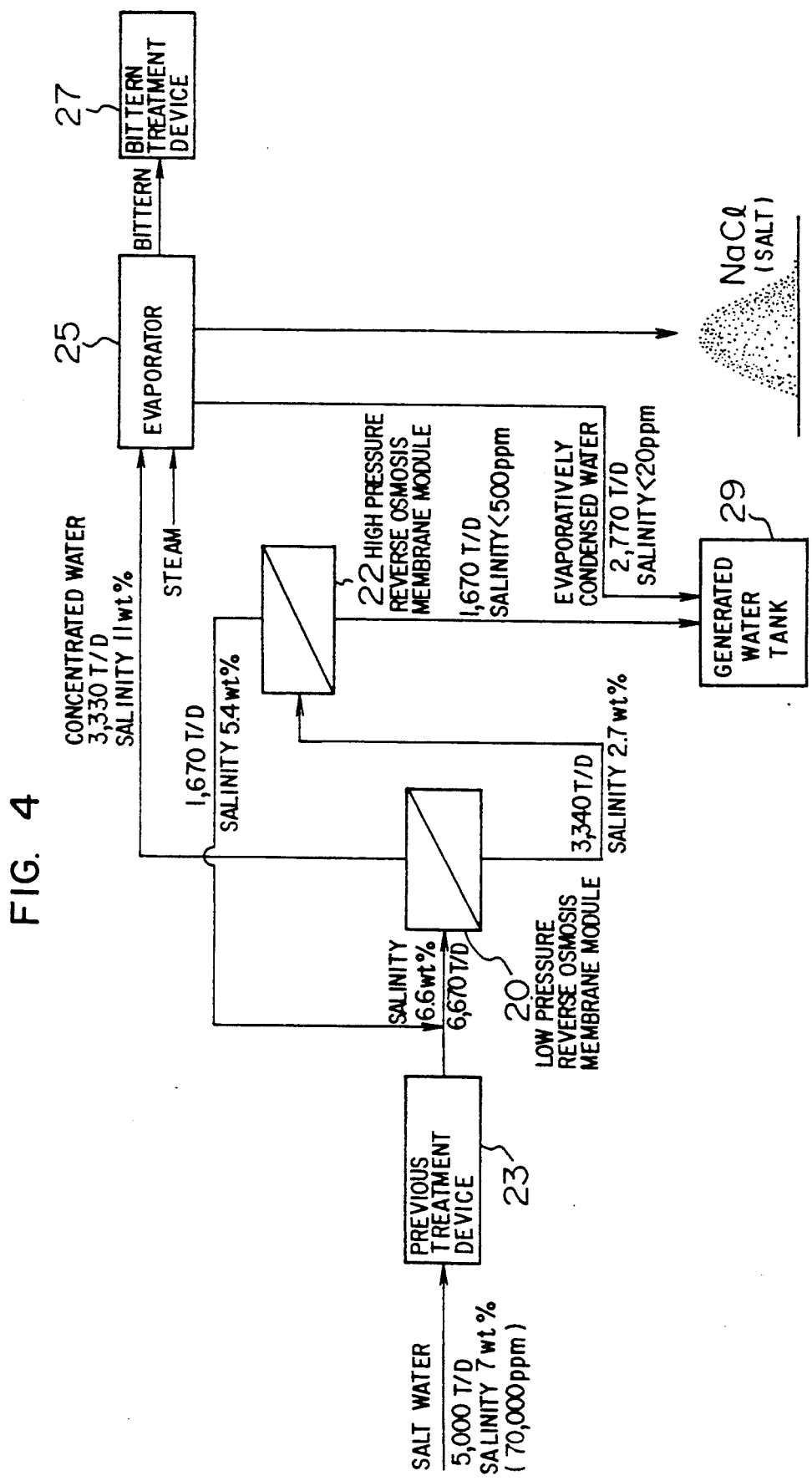
FIG. 4 schematically illustrates a still further embodiment for treating salt water of a relatively high density (70,000 ppm)

FIG. 4 illustrates a case where salt water, the flow rate of which is 5,000 T/D and the salinity level of which is 70,000 ppm, is treated by a structure constituted by combining the two-stage reverse osmosis membrane method and the evaporating method.

Salt water is first introduced into a pretreatment device 23 in which solid materials and iron and manganese contents which are contained, in a trace quantity, in salt water are removed before Ca is removed and pH is adjusted to about 6.5 (pH before the treatment is about 7.5). Then, the pressure of salt water is raised to about 60 kg/cm²G before it is supplied to a low-pressure reverse osmosis membrane module 20.

The first membrane module 20 employs a synthetic composite membrane having a characteristic of low operational pressure and a low salt rejection ratio so that a portion of about 50% of the supplied water passes through the low pressure membrane and thereby desalted water, the flow rate of which is 3,340 T/D and a salinity of about 27,000 ppm, is obtained. The residual portion, that is, a portion of about 50% is concentrated so that salt water, the salinity level of which is 110,000 ppm and the flow rate of which is 3,330 T/D, is obtained before being supplied to an ensuing evaporating device 25 (for example, a multi-effect evaporating device).

The pressure of desalted water obtained by the first low-pressure reverse osmosis membrane module 20 is raised to about 65 kg/cm²G before it is supplied to a high-pressure reverse osmosis membrane module 22 which employs an ordinary reverse osmosis membrane for producing fresh water from sea water. A portion of about 50% of supplied water passes through the high pressure membrane so that 1,670 T/D desalted water of a potable water quality the salinity level of which is 500 ppm or lower, is obtained. The residual portion, that is, a portion of about 50% of the same is concentrated to 1,670 T/D salt water the salinity of which is 54,000 ppm. Then, concentrated water thus-obtained is supplied to the supply side of the low-pressure reverse osmosis membrane 20 in which it joins the salt-water supply which has been subjected to the pretreatment. Then, they are treated with the low pressure reverse osmosis membrane module 20 before it is supplied to the evaporating device 25. Reference numeral 27 represents a bittern treatment device, and 29 represents a product water tank.

Since the present invention is constituted as described above, the following effects can be obtained.

(1) Since salt water is treated to be separated into desalted water of a potable water quality and high density concentrated water, the salinity level of which is 80,000 to 120,000 ppm, salt can be obtained in the form of crystals in the case where high density concentrated water is treated in the evaporation process. In addition, energy consumption can be reduced.

(2) Table 1 shows the water producing ratios respectively realized by a conventional evaporating method, a method constituted by combining a single-stage reverse osmosis membrane method and the evaporating method and the method according to the present invention shown in FIG. 3, the water producing ratios being realized after relatively low density salt water, the salinity level of which is 44,000 ppm, is subjected to the permeation treatment then it is subjected to the evaporation process. It can be understood from Table 1 that the method shown in FIG. 3 exhibits a significantly high water producing ratio.

TABLE 1

|  | Water producing ratio at reverse osmosis membrane portion | Water producing ratio at evaporating portion |
| --- | --- | --- |
| Evaporating method | 0 | 100 |
| Single-stage reverse osmosis membrane method + evaporating method | 37 | 63 |
| Method shown in FIG. 3 | 61 | 39 |

(3) Table 2 shows the water producing ratios respectively realized by the conventional evaporating method, the method constituted by combining the single-stage reverse osmosis membrane method and the evaporating method and the method according to the present invention shown in FIG. 4, the water producing ratios being realized after relatively high density salt water, the salinity level of which is 70,000 ppm, has been subjected to the permeation treatment then it is subjected to the evaporation process (see FIG. 4). It can be understood from Table 2 that the method shown in FIG. 4 exhibits a significantly high water producing ratio.

TABLE 2

|  | Water producing ratio at reverse osmosis membrane portion | Water producing ratio at evaporating portion |
| --- | --- | --- |
| Evaporating method | 0 | 100 |
| Single-stage reverse osmosis membrane method + evaporating method | Impossible to be applied | 100 |
| Method shown in FIG. 4 | 35 | 65 |

(4) An assumption is made that energy cost for producing water is 25 kwh/m$^3$ in the case of the evaporation method and 7 kwh/m$^3$ (according to data issued by "Water Generation Promotion Center") in the case of the reverse osmosis membrane method. Then, a comparison about the energy cost is made between the method according to the present invention shown in FIG. 3 in (2) and the method shown in FIG. 4 in (3). As a result, the following results shown in Table 3 were obtained.

TABLE 3

|  | In a case where relatively low density salt water the salinity of which is 44,000 ppm is treated | In a case where relatively high density salt water the salinity of which is 70,000 ppm is treated |
| --- | --- | --- |
| Evaporating method | 100 | 100 |
| Single-stage reverse osmosis membrane method + evaporating method | 73 | Impossible to be applied |
| Method shown according to the present invention (evaporation process included) | 56 | 75 |

As can be seen from Table 3, in the case where salt water of a relative low density is treated, it can be understood that the method according to the present invention in which the evaporation process is combined displays a significantly satisfactory effect, that is, it can be understood that the energy cost can be saved by 40% or more. In the case where salt water of a relatively high density is treated, the energy cost can be saved by about 25% although this effect is relatively restricted in comparison to that obtained in the case where salt water of a relatively low density is treated.

Then, another embodiment of the method and the apparatus will now be described in which a solution is concentrated by means of a low pressure reverse osmosis membrane. More particularly, this embodiment relates to a method and an apparatus for further concentrating raw liquid by using the low pressure reverse osmosis membrane in a case where the density of the raw liquid cannot be treated by the conventional high pressure reverse osmosis membrane.

Hitherto, a solution is concentrated in the industrial field by an evaporation method, an electrodialysis method, a reverse osmosis method or the like. Since the evaporation method involves a phase change, excessively large energy is required in comparison to the electrodialysis method and the reverse osmosis method. On the other hand, since the electrodialysis method and the reverse osmosis method do not involve the phase change, an advantage can be obtained in that energy consumption can be considerably reduced. However, the electrodialysis method cannot be adapted to cases except for the case where the subject liquid to be treated is the electrolytic solution. On the contrary, the reverse osmosis method is able to treat a variety of solutions including the electrolytic solution.

Hitherto, when a solution is concentrated by using the reverse osmosis membrane, a membrane displaying a high salt rejection ratio has been employed in order to improve the concentrating efficiency. In this case, the concentration can be performed effectively during a period in which the density of supplied raw liquid is relatively low. However, if the density of supplied raw liquid is high, the difference in the solute density between the concentrating side of the membrane and the permeated side is enlarged excessively, causing the difference in the osmotic pressure to be enlarged. Therefore, the following problems arise in that:

(A) Since excessively high pressure must be used to perform the reverse osmosis operation, large energy must be used.

(B) The membrane, the membrane element and the vessel to which the membrane element is fastened must have satisfactory pressure resistance.

(C) Since the quantity of liquid which is able to permeate the membrane is excessively reduced, the concentration cannot be obtained.

Accordingly, if a subject solution is desired to be concentrated satisfactorily, the conventional technology must employ, for example, an evaporation process in which concentrated water obtained by the reverse osmosis method is treated at the intermediate point during the operation, the evaporation process or the like consuming an excessively large quantity of energy even if the reverse osmosis method is first employed.

There has been disclosed a reverse osmosis treatment method in Japanese Patent Laid-Open No. 55-1827 which is characterized in that the temperature of rich liquid (liquid to be treated) is made higher than that of thin liquid (permeated liquid) in a case where liquid to be treated is treated by the reverse osmosis membrane.

Furthermore, a method of concentrating a solution has been disclosed in Japanese Patent Laid-Open No. 49-134576 which is characterized in that a high pressure solution to be treated is introduced into the first chamber of the reverse osmosis membrane cells and liquid (for example, salt water) possessing osmotic pressure higher than that of liquid permeated from the first chamber is introduced into the second chamber.

In a case where raw liquid to be concentrated is treated by using the conventional high pressure reverse osmosis membrane, the pressure required to be applied for the purpose of performing the treatment is raised over the durable pressure level of the membrane or the vessel due to the increase in the osmotic pressure difference between the concentrating side and the permeated side in accordance with the rise in the density of raw liquid. The above-described pressure is usually a level higher than 40 to 70 kg/cm$^2$ although it is determined depending upon the subject solute. Therefore, if the density exceeds the above-described level, the conventional high pressure reverse osmosis membrane cannot treat the subject raw liquid.

According to the above-described disclosure made in Japanese Patent Laid-Open No. 55-1827, the concentration of a solution by using the reverse osmosis membrane has been described. The thesis of this disclosure lies in that the temperature of the liquid on the concentrating side of the reverse osmosis membrane is made higher than that of the permeated liquid. As a result, the osmotic pressure depending upon the temperature difference is generated between the concentrating side of the membrane and the permeated side of the same (positive osmotic pressure acts from the concentrating side to the permeated side). Consequently, the pressure to be applied to the concentrating side is lowered. In this case, the degree of concentration can be raised if the pressure level to be applied is the same as that in a case where no temperature difference is given. As described above, the method according to Japanese Patent Laid-Open No. 55-1827 is characterized in that the temperature is made different between the liquid on the concentrating side and the permeated liquid.

Also the disclosure according to Japanese Patent Laid-Open No. 49-134576 relates to the method of concentrating a solution by using the reverse osmosis membrane. The above-disclosed method of concentrating a solution is characterized in that liquid to be concentrated is supplied to the high pressure side (concentrating side) of the reverse osmosis membrane and liquid possessing an osmotic pressure level higher than the osmotic pressure of permeated liquid from the concentrating side to the permeated side is introduced into the low pressure side (permeated side) of the reverse osmosis membrane.

Both the above-described conventional methods are the same as the present invention in terms of the technological object of reducing the difference in the osmotic pressure between the concentrating side of the reverse osmosis membrane and the permeated side of the same. However, the present invention is different from the invention disclosed in Japanese Patent Laid-Open No. 55-1827 which utilizes osmotic Pressure depending upon temperature differences. In addition, the present invention is different from the invention disclosed in Japanese Patent Laid-Open No. 49-134567 in which liquid possessing an osmotic pressure higher than the permeated liquid is forcibly introduced into the permeated side of the membrane. The present invention utilizes the characteristics of the low pressure reverse osmosis membrane so as to reduce the difference in the osmotic pressure and thereby realize a high degree of concentration.

Accordingly, an object of the present invention is to provide a novel method and an apparatus characterized in that a reverse osmosis membrane is used so that a high density solution, which has not been treated by the conventional method utilizing the reverse osmosis method, is concentrated.

Figure 5:
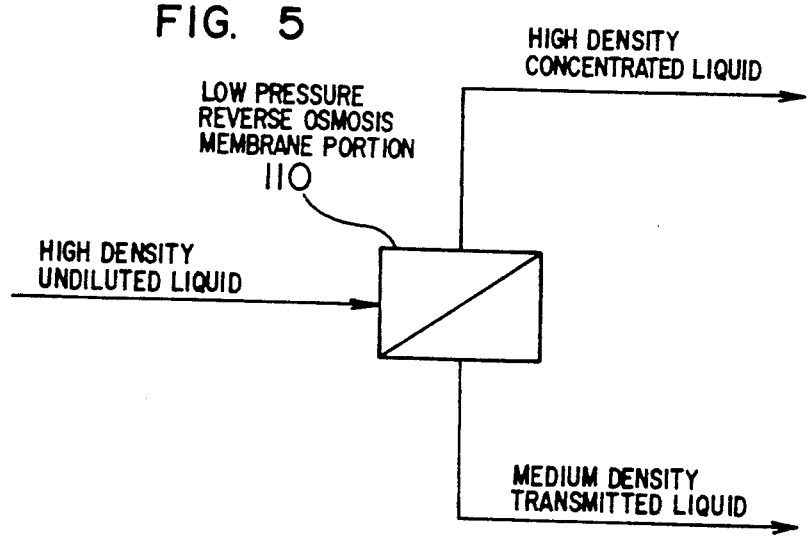
FIG. 5 is a schematic view which illustrates an embodiment of a device for concentrating a solution by using a reverse osmosis membrane according to the present invention.

FIG. 5 illustrates an embodiment of a method of concentrating a solution by means of a low pressure reverse osmosis membrane. According to this embodiment, high density raw liquid is passed through a low pressure reverse osmosis membrane before it is separated into high density concentrated liquid and medium density permeated liquid. Reference numeral 110 represents a low pressure reverse osmosis membrane portion capable of employing elements formed into a hollow fiber type, a spiral type, a tubular type, a pleated type, a flat plate type or the like.

The term "high density solution" means liquid of a density of a level which cannot be treated by a conventional high pressure reverse osmosis membrane. The density varies depending upon the type of the solution. For example, in the case where the subject solution is salt water, the "high density solution" means a solution the density of which is 5 wt % or higher.

Figure 6:
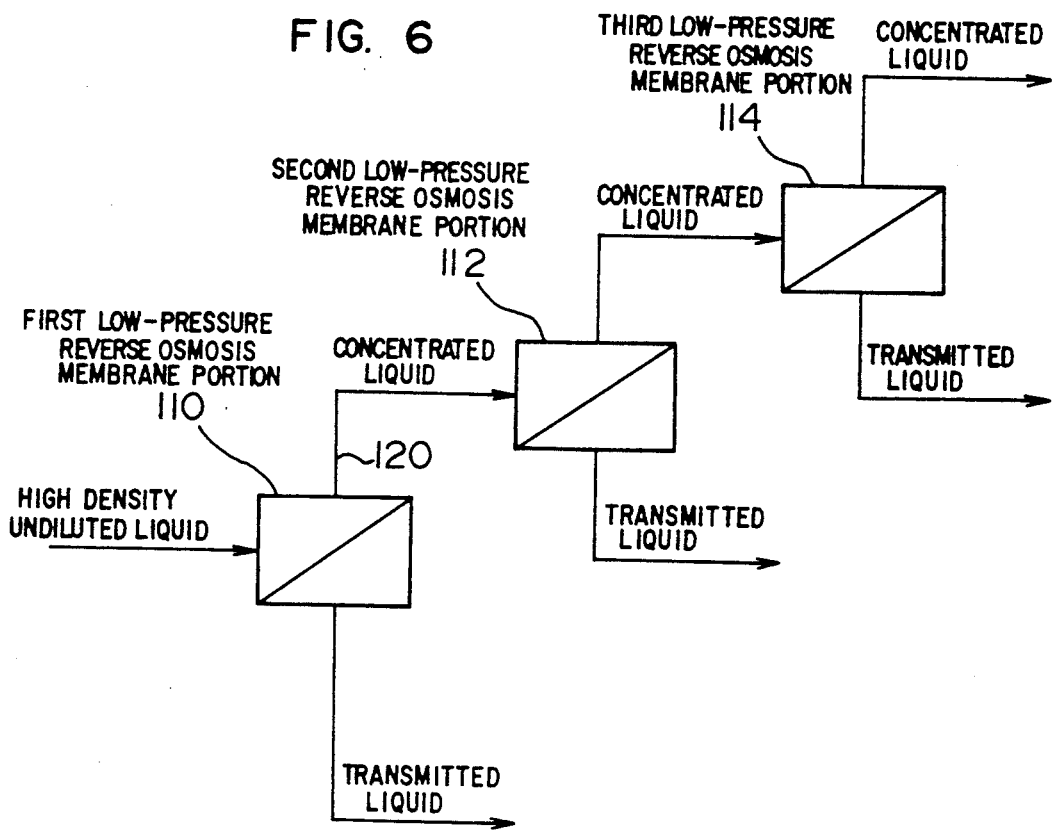
FIG. 6 is a schematic view which illustrates another embodiment of the same.

Another embodiment is shown in FIG. 6 characterized in that a process, in which concentrated liquid (the density of which is higher than the above-described "high density raw liquid)" is passed through a low pressure reverse osmosis membrane, is repeated one to several times. According to this embodiment, a low pressure reverse osmosis membrane portion composed of three stages is used. That is, concentrated liquid obtained in a first low-pressure reverse osmosis membrane portion 110 is passed through a second low-pressure reverse osmosis membrane portion 112 before concentrated liquid obtained in this second low-pressure reverse osmosis membrane portion 112 is passed through a third low-pressure reverse osmosis membrane portion 114 so that it is separated into high density concentrated liquid and permeated liquid.

Figure 7:
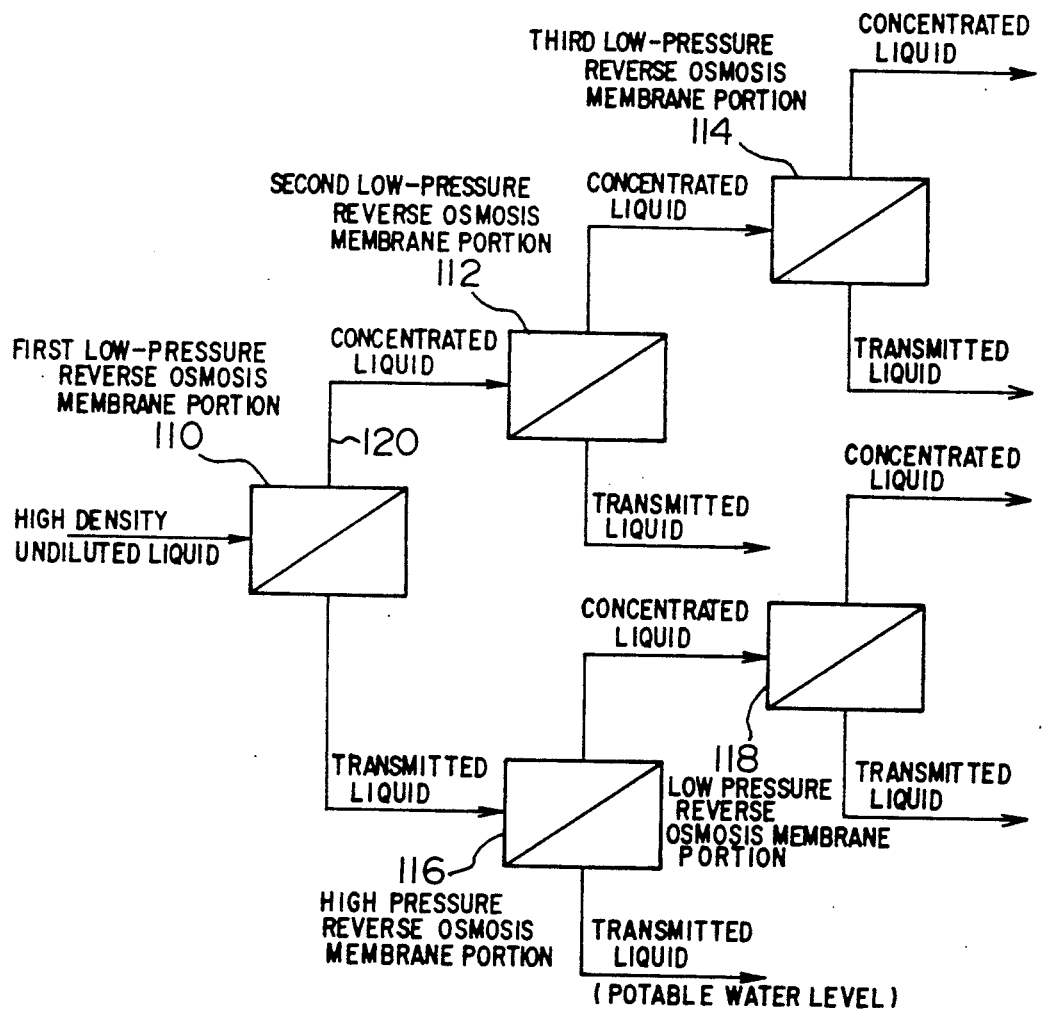
FIG. 7 is a schematic view which illustrates another embodiment of the same.

Another embodiment is shown in FIG. 7 in which permeated liquid is passed through a high pressure reverse osmosis membrane or a low pressure reverse osmosis membrane in accordance with its density. As shown in FIG. 7, according to this embodiment, liquid which passes through the first low-pressure reverse osmosis membrane portion 110 is passed through a high pressure reverse osmosis membrane portion 116 so as to be separated into concentrated liquid and permeated liquid of a the potable water quality. Then, the concentrated liquid thus-obtained is further passed through a low pressure reverse osmosis membrane portion 118 so as to be separated into concentrated liquid and permeated liquid. In a case where the high pressure reverse osmosis membrane portion 116 is used, an advantage can be obtained in that permeated liquid of a portable water quality can be obtained. However, if the potable water level permeated liquid is not required, the low pressure reverse osmosis membrane portion is used in place of the high pressure reverse osmosis membrane portion 116. The present invention is not limited to the structure arranged in such a manner that permeated liquid obtained from the first process is treated. Permeated liquid obtained from the second or ensuing processes may be treated.

Referring to FIGS. 6 and 7, concentrated liquid of substantially the same density, permeated liquid of substantially the same density or concentrated liquid and permeated liquid of substantially the same density may be joined.

As shown in FIGS. 6 and 7, the first low pressure reverse osmosis membrane portion 110 for separating high density raw liquid into concentrated liquid of a higher density and permeated liquid of a medium density is, via a concentrated liquid extracting portion 120, connected to the second low-pressure reverse osmosis membrane portion 112.

FIGS. 6 and 7 respectively illustrate the structure in which the three stages of the low pressure reverse osmosis membrane portions are disposed. However, two or four or more stages of the low pressure reverse osmosis membrane portions may be disposed.

According to the present invention, the term "high pressure membrane" means a membrane exhibiting a salt rejection ratio of about 98% or higher in a case where salt water, the density of which is 1 to 5 wt %, is treated, the membrane being usually used under high pressure the level of which is 50 kg/cm$^2$G or higher. On the other hand, the term "low pressure membrane" means a membrane displaying a salt rejection ratio of about 98% or lower in a case where salt water, the density of which is about 0.1 to 1 wt %, is treated, the membrane being usually used under low pressure, the level of which is 30 kg/cm$^2$G or lower. Each of the above-described two types of reverse osmosis membranes is in the form of a hollow fiber type, a spiral type, a tubular type, a pleated type, a flat plate type or the like made of a polymer composite material such as cellulose acetate. In particular, the low pressure membrane module is usually made of a synthetic polymer composite membrane.

In a case where the reverse osmosis membrane portion is formed, it might be considered feasible to employ a method arranged in such a manner that a reverse osmosis membrane element is set as one module and concentration is sequentially performed in units of the module, or to employ method arranged in such a manner that a plurality of elements are connected in one vessel in a manner of a so-called "reject series" so as to form one module in which required concentration is completed or to employ a combination of methods described above.

Figure 8:
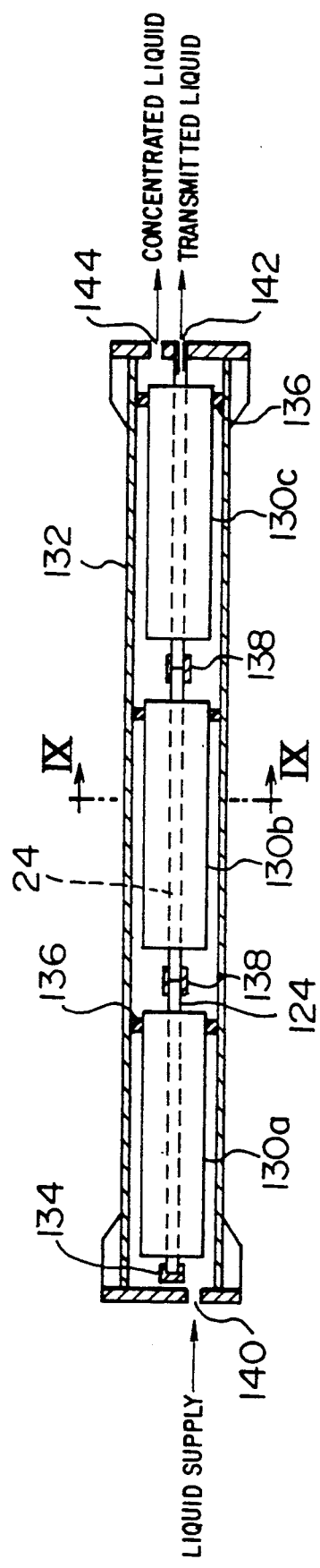
FIG. 8 is a vertical cross sectional view which illustrates an example of the reverse osmosis membrane portion shown in FIGS. 1 to 7 and in a case where a spiral type module is employed.
Figure 10:
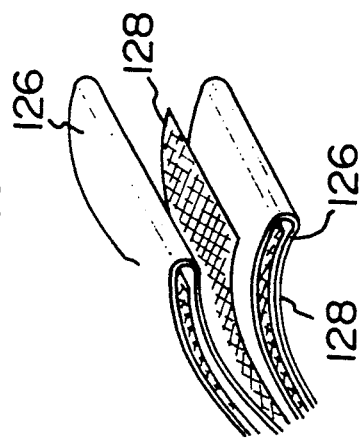
FIG. 10 is a partially enlarged view of the reverse osmosis membrane shown in FIG. 9.
Figure 9:
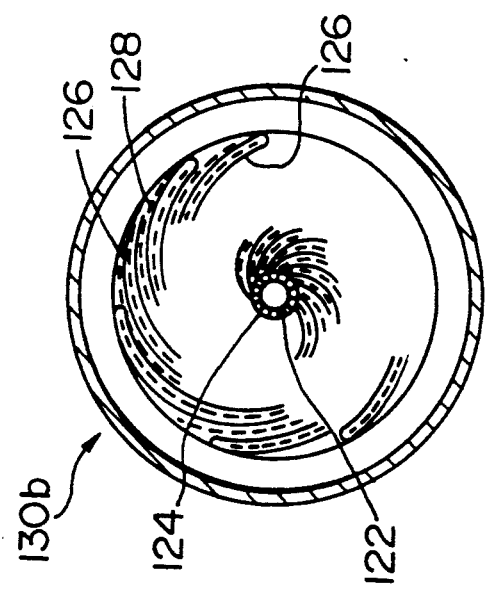
FIG. 9 is an enlarged cross sectional view taken along line IX—IX of FIG. 8.

FIGS. 8 to 10 illustrate an example of the reverse osmosis membrane portion formed into a spiral module.

While overlapping to form circular arcs, flat bag-like reverse osmosis membranes 126 are, via spacers 128, wound around a center pipe 124 having a multiplicity of apertures 122 so that reverse osmosis membrane elements 130a, 130b and 130c are formed. A plurality of the elements thus-formed are disposed in series in a cylindrical vessel 132. Reference numeral 134 represents an end cap, 136 represents a seal for sealing concentrated liquid and 138 represents a connector.

Supplied liquid (high density raw liquid, concentrated liquid or permeated liquid) introduced through a supplied liquid port 140 formed at an end of the vessel 132 is passed through the reverse osmosis membrane 126 of the first reverse osmosis membrane element 130a. Permeated liquid is accumulated in the center pipe 124, and concentrated liquid is supplied to the second reverse osmosis membrane element 130b. Permeated liquid is then accumulated in the center pipe 124, and concentrated liquid is supplied to the third reverse osmosis membrane element 130c. Then, permeated liquid is accumulated in the center pipe 124 before it is extracted through a permeated liquid outlet port 142 together with the above-described permeated liquid, while high density concentrated liquid is extracted through a concentrated liquid outlet port 144.

Although FIG. 8 illustrates a case where the reverse osmosis membrane elements are connected to form three stages, two or four or more elements may be connected.

The low pressure reverse osmosis membrane is usually used in a case where the salt rejection ratio is 98% or lower and the operational pressure is 30 kg/cm$^2$G or lower. It is used to treat relatively low density (about 1,000 to 10,000 ppm in a case of salt water) liquid. Since a membrane of the above-described type has been used for the purpose of reducing the density of the permeated liquid, the structure in which it is used to treat high density liquid has been scarcely employed. That is, since its salt rejection ratio is too low, a large quantity of the solute moves to the permeated side. Therefore, a desired object cannot be achieved.

The present invention, in contrast, utilizes the above-described characteristic of the low pressure reverse osmosis membrane so that high density liquid is further concentrated. The principle of this concentration is described below.

The pressure to be applied to the reverse osmosis membrane is composed of the osmotic pressure depending upon the difference between the density on the concentrating side of the membrane and that on the permeated side and physical fluid pressure loss generated when liquid passes through the membrane. The low pressure reverse osmosis membrane displays a relatively low salt rejection ratio in comparison to the high pressure reverse osmosis membrane. Further, the above-described salt rejection ratio is inversely proportional to the solute density. Therefore, even if a high density solution is supplied, the liquid density on the permeated side is not excessively lowered as is in the case of the high pressure reverse osmosis membrane displaying a high salt rejection ratio. As a result, a solution of a medium density can be obtained. Therefore, the difference between the density on the concentrating side and that on the permeated side is not enlarged excessively and thereby the difference in the osmotic pressure is not enlarged excessively.

Figure 11:
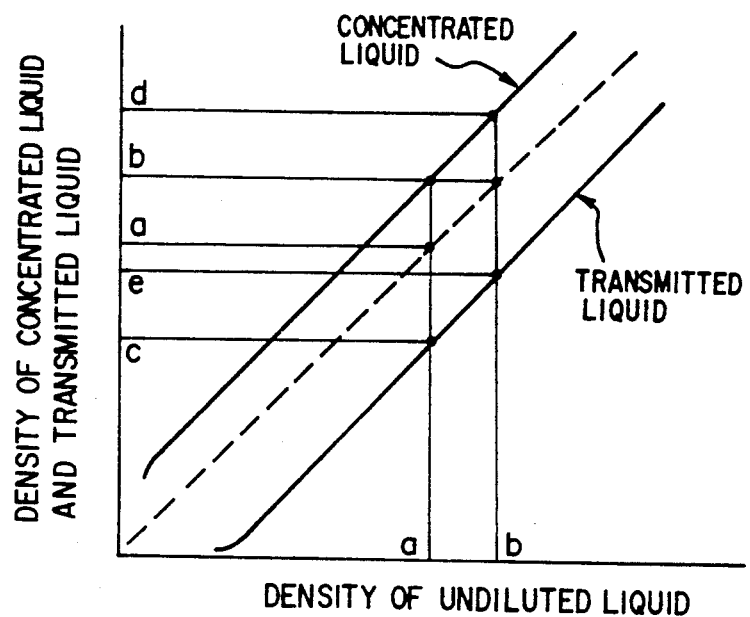
FIG. 11 is a graph which schematically illustrates the relationship between the density of raw liquid and density of concentrated liquid and permeated liquid at the time of concentrating a solution by using a low pressure reverse osmosis membrane.

The above-described fact is schematically illustrated in FIG. 11.

FIG. 11 is a graph which illustrates the concentrating characteristic possessed by the low pressure reverse osmosis membrane under pressure of a predetermined level. That is, when raw liquid, the density of which is a, is supplied, concentrated liquid, the density of which is b (b>a), and permeated liquid, the density of which is c, (c<a) are obtained. When concentrated liquid, the density of which is b, is supplied to the next reverse osmosis membrane, further concentrated liquid, the density of which is d (d>b), and permeated liquid, the density of which is e (e>b), are obtained. By repeating the above-described operation, a high degree concentration can be achieved. However, since FIG. 11 is a schematic view, the degree of concentration must be determined in consideration of economical efficiency because the concentrating efficiency deteriorates (in actual fact the interval between the line standing for concentrated liquid and the line standing for permeated liquid is gradually narrowed) when the density of raw liquid is raised.

An experimental example of the present invention is described below.

EXPERIMENTAL EXAMPLE 1

A concentration experiment was performed in such a manner that high density salt water, the density of which was 6.8 to 14.8 wt %, which had been impossible to be concentrated, was concentrated by using a membrane element having a low pressure reverse osmosis membrane A possessing the following characteristics:

| | | |
|---|---|---|
| Salt rejection ratio | 97% | |
| Evaluation conditions | Pressure: | 15 kg/cm$^2$G |
| | Temperature: | 25° C. |
| | Density of supplied | 500 mg/l as NaCl |

Figure 12:
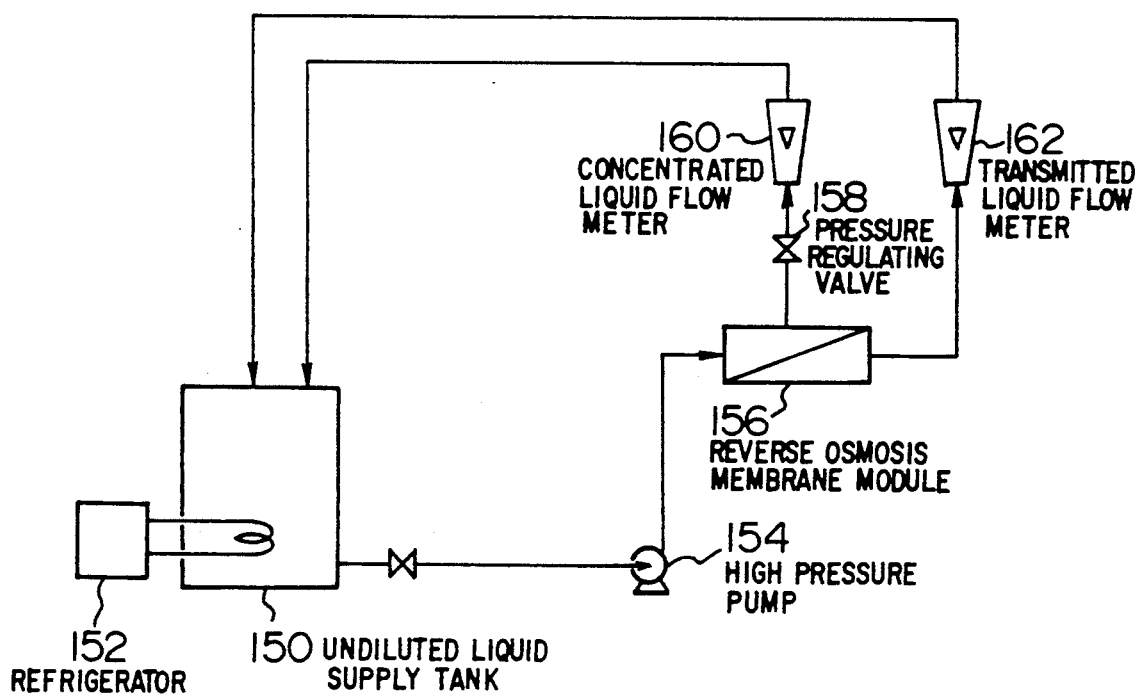
FIG. 12 is a flow chart of an experimental device for concentration experiments according to Experimental Examples 1 and 2.

-continued water:

A testing apparatus shown in FIG. 12 was used under the following experimental conditions: referring to FIG. 12, reference numeral 150 represents a raw liquid supply tank, 152 represents a cooling device, 154 represents a high pressure pump, 156 represents a reverse osmosis membrane module, 158 represents a pressure regulating valve, 160 represents a concentrated-liquid flow meter and 162 represents a permeated liquid flow meter.

| Temperature of liquid supplied | 30° C. |
|---|---|
| Pressure of liquid supplied | 65 kg/cm² |
| Flow rate of concentrated water | 15 l/min |

Thus, the results shown in Table 4 were obtained.

TABLE 4

| Density of raw water (wt %) | Density of concentrated water (wt %) | Density of permeated water (wt %) | Flow rate of permeated water (l/ml) | Salt rejection ratio (%) |
|---|---|---|---|---|
| 6.8 | 7.8 | 2.9 | 3.7 | 60.3 |
| 9.9 | 10.5 | 5.7 | 1.9 | 44.1 |
| 13.1 | 13.6 | 9.1 | 1.4 | 31.8 |
| 14.8 | 15.0 | 11.0 | 1.1 | 26.2 | where the salt rejection ratios are the values obtainable from the following equation:

$$\text{Salt rejection ratio} = \left[1 - \frac{\text{density of permeated water}}{\frac{\text{density of raw water} + \text{density of concentrated water}}{2}}\right] \times 100 \, (\%)$$

EXPERIMENTAL EXAMPLE 2

A concentration experiment was performed in such a manner that high density salt water, the density of which was 9.8 to 14.9 wt %, and which has been impossible to be concentrated, was concentrated by using a membrane element having a low pressure reverse osmosis membrane B possessing the following characteristics:

| Salt rejection ratio | 98% | |
|---|---|---|
| Evaluation conditions | Pressure: | 15 kg/cm²G |
| | Temperature: | 25° C. |
| | Density of supplied water: | 1500 mg/l as NaCl |

A testing apparatus shown in FIG. 12 was used under the following experimental conditions:

| Temperature of liquid supplied: | 30° C. |
|---|---|
| Pressure of liquid supplied: | 65 kg/cm² |
| Flow rate of concentrated water: | 15 l/min |

Thus, the results shown in Table 5 were obtained.

TABLE 5

| Density of raw water (wt %) | Density of concentrated water (wt %) | Density of permeated water (wt %) | Flow rate or permeated water (l/min) | Salt rejection ratio (%) |
|---|---|---|---|---|
| 9.8 | 10.6 | 7.0 | 3.8 | 31.4 |
| 12.9 | 13.5 | 10.6 | 3.5 | 19.7 |
| 14.9 | 15.5 | 12.8 | 3.5 | 15.8 |

Since the present invention is constituted as described above, the following effects can be obtained:

(a) According to the method of the present invention, a high density liquid, which has been able to be treated by the evaporation method, can be concentrated depending upon the type of liquid to be treated. Therefore, energy required to complete the concentration can be saved. However, since a limit is present in the degree of concentration achieved according to the present invention, the evaporation method must be employed if a further concentration is desired. However, also energy can be saved in the above-described case because the quantity of evaporation is reduced by a degree which corresponds to the increase in the quantity of concentration by means of the reverse osmosis membrane.

(b) In addition to the energy saving, if the method according to the present invention is adapted to concentrate fruit juice, a satisfactory retention ratio of the aromatic component of fruit juice can be realized in comparison to the evaporation method.

(c) The present invention can be adapted to treat various solutions such as, various salt solutions, effluents from plating processes (recovery by concentrating useful metal), drain containing organic matter, fruit juice, and saccaroliquid which are the subjects to be treated by the reverse osmosis membrane.

Although the invention has been described in its preferred form, it is to be understood that the present invention may be changed or modified without departing from the spirit and the scope of the invention as hereinafter claimed.

What is claimed is:

1. A method of treating salt water comprising the steps of:
   coarsely desalting by passing salt water having a salinity level of at least 30,000 ppm through a plurality of reverse osmosis membrane stages, at least one of which is a low pressure reverse osmosis membrane stage operated at a pressure of at least 30 kg/cm²G, so as to separate it into desalted water of a potable water quality and high density concentrated water, the salinity level of which is 80,000 to 120,000 ppm.

2. A method of treating salt water according to claim 1, wherein said high density concentrated water, which has been supplied from a low pressure reverse osmosis membrane stage and the salinity level of which is 80,000 to 120,000 ppm, is supplied to an evaporation process so as to obtain salt in the form of crystals.

3. A method of treating salt water comprising the steps of:
   raising the pressure of relatively low density salt water, the salinity level of which is 30,000 to 60,000 ppm, to 40 to 70 kg/cm²G;
   passing it through a high pressure reverse osmosis membrane stage so as to separate it into desalted water of a potable water quality and medium density concentrated water; and coarsely desalting by passing said medium density concentrated water having a salinity level of at least 30,000 ppm into a low pressure reverse osmosis membrane stage operated at a pressure of at least 30 kg/cm$^2$G so as to separate it into coarsely desalted water and high density concentrated water, the salinity level of which is 80,000 to 120,000 ppm.

4. A method of treating salt water according to claim 3, wherein said high density concentrated water, which has been supplied from said low pressure reverse osmosis membrane stage and the salinity level of which is 80,000 to 120,000 ppm, is supplied to an evaporation process so as to obtain salt in the form of crystals.

5. A method of treating salt water according to claim 3, wherein said coarsely desalted water supplied from said low pressure reverse osmosis membrane stage is supplied to said high pressure reverse osmosis membrane stage.

6. A method of treating salt water according to of claim 5, wherein said high density concentrated water, which has been supplied from said low pressure reverse osmosis membrane stage and the salinity level of which is 80,000 to 120,000 ppm, is supplied to an evaporation process so as to obtain salt in the form of crystals.

7. A method of treating salt water comprising the steps of:

passing relatively high density salt water, the salinity level of which is 50,000 to 80,000 ppm, through a low pressure reverse osmosis membrane stage under pressure, the level of which is 30 to 70 kg/cm$^2$G, so as to separate it into coarsely desalted salt water and high density concentrated water, the salinity level of which is 80,000 to 120,000 ppm;

raising the pressure of said coarsely desalted water to 40 to 70 kg/cm$^2$G; and passing said coarsely desalted water into a high pressure reverse osmosis membrane stage so as to separate it into desalted water of a potable water quality and medium density concentrated water.

8. A method of treating salt water according to claim 7, wherein said high density concentrated water, which has been supplied from said low pressure reverse osmosis membrane stage and the salinity level of which is 80,000 to 120,000 ppm, is supplied to an evaporation process so as to obtain salt in the form of crystals.

9. A method of treating salt water according to claim 7, wherein said medium density concentrated water supplied from said high pressure reverse osmosis membrane stage is supplied to a low pressure reverse osmosis membrane stage.

10. A method of treating salt water according to any one of claim 9, wherein said high density concentrated water, which has been supplied from said low pressure reverse osmosis membrane stage and the salinity level of which is 80,000 to 120,000 ppm, is supplied to an evaporation process so as to obtain salt in the form of crystals.

11. An apparatus for treating salt water comprising:

a pressure pump sized and selected for raising the pressure of relatively low density salt water, the salinity level of which is 30,000 to 60,000 ppm, to 40 to 70 kg/cm$^2$G;

a high pressure reverse osmosis membrane module for receiving said salt water, the pressure of which has been raised, so as to separate it into desalted water of a potable water quality and medium density concentrated water; and a low pressure reverse osmosis membrane module for separating said medium density concentrated water into coarsely desalted water and high density concentrated water the salinity level of which is 80,000 to 120,000 ppm.

12. An apparatus for treating salt water comprising:

a low pressure reverse osmosis membrane module for receiving relatively high density salt water, the salinity level of which is 50,000 to 80,000 ppm, under pressure the level of which is 30 to 70 kg/cm$^2$G so as to separate it into coarsely desalted water and high density concentrated water the salinity level of which is 80,000 to 120,000 ppm;

a pressure pump sized and selected for raising the pressure of said coarsely desalted water to 40 to 70 kg/cm$^2$C; and high pressure reverse osmosis membrane module for receiving said coarsely desalted water, the pressure of which has been raised, so as to separate it into desalted water of a potable water quality and medium density concentrated water.

13. A method of concentrating a solution by using a reverse osmosis membrane, said method comprising the steps of:

passing high density raw liquid into a low pressure reverse osmosis membrane stage at a pressure of at least 30 kg/cm$^2$G, thereby separating it into concentrated liquid of a higher density and a medium density permeated liquid.

14. A method of concentrating a solution by using a reverse osmosis membrane according to claim 13, wherein there is added one or more stages of passing concentrated liquid through a low pressure reverse osmosis membrane, the density of the concentrated liquid being higher than said high density raw liquid.

15. A method of concentrating a solution by using a reverse osmosis membrane according to claim 14, wherein said high density raw liquid is salt water, and the salinity level of the concentrated salt water after passing through said one or more added stages is about 150,000 to about 155,000 ppm.

16. A method of concentrating a solution by using a reverse osmosis membrane according to claim 13, wherein permeated liquid is passed through a high pressure reverse osmosis membrane or a low pressure reverse osmosis membrane in accordance with its density so as to separate it into concentrated liquid and transmitted liquid.

17. A method of concentrating a solution by using a reverse osmosis membrane according to claim 13, wherein said high density raw liquid is salt water, and the salinity level of the concentrated salt water is about 150,000 to about 155,000 ppm.

18. An apparatus for concentrating a solution by using a reverse osmosis membrane, said apparatus at least comprising:

a pressure pump, sized and selected for raising the pressure of liquid to be treated to a pressure of at least 30 kg/cm$^2$G;

a first low-pressure reverse osmosis membrane portion for separating high density raw liquid into higher density concentrated liquid and medium density permeated liquid; and a second low-pressure reverse osmosis membrane portion connected to said first low-pressure reverse osmosis membrane portion via a concentrated liquid extracting portion.

19. An apparatus for concentrating a solution by using a reverse osmosis membrane according to claim 16, wherein said high density raw liquid is salt water, and the salinity level of the concentrated salt water after passing through said second low-pressure reverse osmosis membrane is 150,000 to 155,000 ppm.

* * * * *

UNITED STATES PATENT AND TRADEMARK OFFICE
CERTIFICATE OF CORRECTION

PATENT NO. : 5,238,574

DATED : August 24, 1993

INVENTOR(S) : Kawashima et al.

It is certified that error appears in the above-indentified patent and that said Letters Patent is hereby corrected as shown below:

Claim 12, column 16, line 12, change "$kg/cm^2C$" to --$kg/cm^2G$--.

Signed and Sealed this

Fifth Day of April, 1994

Attest:

BRUCE LEHMAN

Attesting Officer

Commissioner of Patents and Trademarks